United States Patent
Nakamoto et al.

(10) Patent No.: US 10,656,565 B2
(45) Date of Patent: May 19, 2020

(54) DRIVE TRANSMISSION DEVICE AND IMAGE FORMING APPARATUS INCORPORATING THE DRIVE TRANSMISSION DEVICE

(71) Applicants: Shogo Nakamoto, Kanagawa (JP); Hiroaki Takagi, Kanagawa (JP)

(72) Inventors: Shogo Nakamoto, Kanagawa (JP); Hiroaki Takagi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/293,833

(22) Filed: Mar. 6, 2019

(65) Prior Publication Data
US 2019/0286017 A1 Sep. 19, 2019

(30) Foreign Application Priority Data
Mar. 19, 2018 (JP) .................................. 2018-051378

(51) Int. Cl.
*G03G 15/16* (2006.01)
*G03G 21/16* (2006.01)
*F16H 57/00* (2012.01)

(52) U.S. Cl.
CPC ..... *G03G 15/1615* (2013.01); *F16H 57/0025* (2013.01); *G03G 21/1647* (2013.01); *G03G 2221/1657* (2013.01)

(58) Field of Classification Search
CPC .......... G03G 15/1615; G03G 21/1647; G03G 2221/1657; F16H 57/0025
See application file for complete search history.

(56) References Cited

U.S. PATENT DOCUMENTS

| | | | | | |
|---|---|---|---|---|---|
| 2,845,809 | A | * | 8/1958 | Hetzel | F16H 55/18 74/440 |
| 3,359,819 | A | * | 12/1967 | Veillette | F16H 55/18 74/409 |
| 3,385,126 | A | * | 5/1968 | Finch | F16H 55/18 74/440 |
| 3,719,103 | A | * | 3/1973 | Streander | F16H 55/18 74/445 |
| 4,033,198 | A | * | 7/1977 | Seragnoli | B65B 65/02 74/443 |
| 5,768,656 | A | * | 6/1998 | Nagasue | G03G 15/0896 399/167 |
| 5,950,783 | A | * | 9/1999 | Cahill | F16D 27/105 192/12 BA |

(Continued)

FOREIGN PATENT DOCUMENTS

JP 2015-158268 9/2015
JP 2016-148381 8/2016

*Primary Examiner* — G.M. A Hyder
(74) *Attorney, Agent, or Firm* — Harness, Dickey & Pierce, P.L.C.

(57) ABSTRACT

A drive transmission device includes a drive source, a first drive transmitter and a second drive transmitter. The drive source generates a drive force. The second drive transmitter is coaxially arranged with the first drive transmitter and includes a material different from a material of the first drive transmitter. The drive force of the drive source is transmitted between the first drive transmitter and the second drive transmitter. The first drive transmitter is fastened to the second drive transmitter.

18 Claims, 11 Drawing Sheets

(56) References Cited

U.S. PATENT DOCUMENTS

| | | | | |
|---|---|---|---|---|
| 2003/0029263 A1* | 2/2003 | Chang | ............... | F16H 55/14 |
| | | | | 74/439 |
| 2005/0276634 A1* | 12/2005 | Jeon | ............... | G03G 15/757 |
| | | | | 399/167 |
| 2007/0003321 A1* | 1/2007 | Hara | ............... | G03G 15/757 |
| | | | | 399/167 |
| 2016/0238981 A1 | 8/2016 | Suido et al. | | |
| 2017/0357200 A1 | 12/2017 | Takagi et al. | | |
| 2018/0074455 A1 | 3/2018 | Takagi | | |

* cited by examiner ically arranged with the first drive transmitter and including a material different from a material of the first drive transmitter. The drive force of the drive source is transmitted between the first drive transmitter and the second drive transmitter. The first drive transmitter is fastened to the second drive transmitter.

DRIVE TRANSMISSION DEVICE AND IMAGE FORMING APPARATUS INCORPORATING THE DRIVE TRANSMISSION DEVICE

CROSS-REFERENCE TO RELATED APPLICATION

This patent application is based on and claims priority pursuant to 35 U.S.C. § 119(a) to Japanese Patent Application No. 2018-051378, filed on Mar. 19, 2018, in the Japan Patent Office, the entire disclosure of which is incorporated by reference herein.

BACKGROUND

Technical Field

This disclosure relates to a drive transmission device and an image forming apparatus incorporating the drive transmission device.

Description of the Related Art

In the related art, various types of drive transmission devices include a first drive transmitter and a second drive transmitter coaxially arranged with the first drive transmitter and include a material different from a material of the first drive transmitter, in which a drive force of a drive source is transmitted between the first drive transmitter and the second drive transmitter.

A known drive transmission device is known to have a configuration in which a resin gear as the first drive transmitter and a metal gear as the second drive transmitter are press-fitted into the same bearing. A press-fit portion of the metal gear to be fitted into the bearing includes a plurality of grooves each extending in an axial direction and having a cut-away shape, and the grooves are formed at equal intervals. Additionally, a press-fit hole portion of the resin gear to be fitted into the bearing has an inner circumferential surface including protrusions and recesses, and the protrusions on the inner circumferential surface of the resin gear are inserted into the grooves each having the cut-away shape of the press-fit portion of the metal gear, thereby press-fitting the resin gear into the bearing. With such engagement between the protrusions and the grooves of the metal gear, a drive force is transmitted between the first drive transmitter and the second drive transmitter.

SUMMARY

At least one aspect of this disclosure provides a drive transmission device including a drive source, a first drive transmitter, and a second drive transmitter. The drive source generates a drive force. The second drive transmitter is coaxially arranged with the first drive transmitter and including a material different from a material of the first drive transmitter. The drive force of the drive source is transmitted between the first drive transmitter and the second drive transmitter. The first drive transmitter is fastened to the second drive transmitter.

Further, at least one aspect of this disclosure provides an image forming apparatus including a rotary body and the above-described drive transmission device to transmit the drive force of the drive source to the rotary body.

BRIEF DESCRIPTION OF THE DRAWINGS

The aforementioned and other aspects, features, and advantages of an embodiment of this disclosure would be better understood by reference to the following detailed description when considered in connection with the accompanying drawings, wherein.

Figure 1:
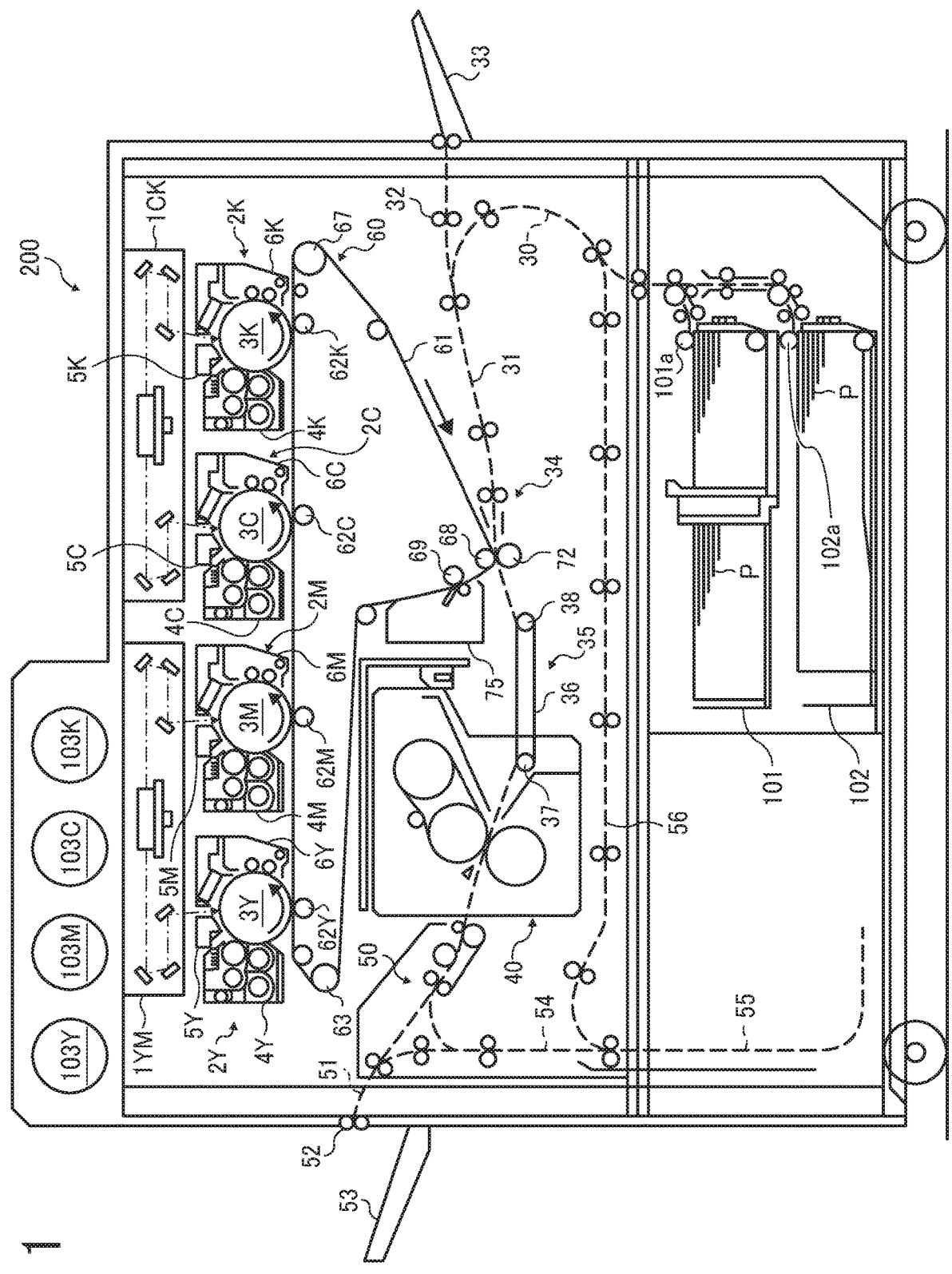
FIG. 1 is a schematic structural view illustrating an example of an image forming apparatus according to an embodiment of this disclosure.

The accompanying drawings are intended to depict embodiments of this disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of this disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, embodiments of this disclosure are described below. In the drawings for explaining the following embodiments, the same reference codes are allocated to elements (members or components) having the same function or shape and redundant descriptions thereof are omitted below.

It is to be noted that elements (for example, mechanical parts and components) having the same functions and shapes are denoted by the same reference numerals throughout the specification and redundant descriptions are omitted.

An embodiment of an electrophotographic image forming apparatus (hereinafter referred to as an image forming apparatus 200) will be described below as an image forming apparatus including a driving device to which this disclosure is applied.

First, a basic structure of the image forming apparatus 200 according to an embodiment of this disclosure will be described.

The image forming apparatus 200 may be a copier, a facsimile machine, a printer, a multifunction peripheral or a multifunction printer (MFP) having at least one of copying, printing, scanning, facsimile, and plotter functions, or the like. According to the present example, the image forming apparatus 200 is an inkjet image forming apparatus that forms toner images on recording media by discharging ink to the recording media.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., an OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying path to a downstream side thereof; the term "width direction" indicates a direction basically perpendicular to the sheet conveying direction.

FIG. 1 is a schematic structural view illustrating an example of the image forming apparatus 200 according to the present embodiment.

The image forming apparatus 200 illustrated in FIG. 1 includes two optical writing units 1YM and 1CK and four process units 2Y, 2M, 2C, and 2K to form toner images of yellow (Y), magenta (M), cyan (C), and black (K). Additionally, the image forming apparatus 200 also includes a sheet feeding passage 30, a pre-transfer conveyance passage 31, a bypass sheet feeding passage 32, a bypass sheet feeding tray 33, a pair of registration rollers 34, a conveyance belt unit 35, a fixing device 40, a conveyance switching device 50, a sheet ejection passage 51, a sheet ejection roller pair 52, and a sheet ejection tray 53. Furthermore, the image forming apparatus 200 also includes a first sheet feeding device 101, a second sheet feeding device 102, and a refeeding device.

Each of the first sheet feeding device 101 and the second sheet feeding device 102 stores, inside thereof, a bundle of recording sheets P as a recording material. A first sheet feeding roller 101a in the first sheet feeding device 101 and a second sheet feeding roller 102a in the second sheet feeding device 102 are rotationally driven respectively to feed an uppermost recording sheet P of the sheet bundle to the sheet feeding passage 30. The sheet feeding passage 30 is linked to the pre-transfer conveyance passage 31 to convey the recording sheet P immediately before a secondary transfer nip described later. The recording sheet P fed from the first sheet feeding device 101 or the second sheet feeding device 102 enters the pre-transfer conveyance passage 31 via the sheet feeding passage 30.

Additionally, the bypass sheet feeding tray 33 is disposed on a side surface of a housing of the image forming apparatus 200 in an openable/closable manner with respect to the housing, and a sheet bundle is manually fed onto a top surface of the bypass sheet feeding tray 33 in an opened state with respect to the housing. An uppermost recording sheet P of the sheet bundle manually set is fed to the pre-transfer conveyance passage 31 by a feed-out roller of the bypass sheet feeding tray 33.

Each of the two optical writing units 1YM and 1CK includes a laser diode, a polygon mirror, various kinds of lenses, and the like, and drives the laser diode based on image information transmitted from a personal computer or the like. Then, the optical writing units optically scan the photoconductors 3Y, 3M, 3C, and 3K of the process units 2Y, 2M, 2C, and 2K. Specifically, the photoconductors 3Y, 3M, 3C, and 3K of the process units 2Y, 2M, 2C, and 2K are rotationally driven in a counterclockwise direction in FIG. 1.

The optical writing unit 1YM irradiates the currently-driven photoconductors 3Y and 3M with laser light to perform the optical scanning processing while deflecting the laser light in respective rotation axis directions. Consequently, electrostatic latent images based on Y image information and M image information are formed on the photoconductors 3Y and 3M, respectively.

Additionally, the optical writing unit 1CK irradiates the currently-driven photoconductors 3C and 3K with laser light to perform the optical scanning processing while deflecting the laser light in respective rotation axes. Consequently, electrostatic latent images based on C image information and K image information are formed on the photoconductors 3C and 3K, respectively.

The process units 2Y, 2M, 2C, and 2K include the drum-shaped photoconductors 3Y, 3M, 3C, and 3K as image bearers (latent image bearers), respectively. Additionally, the process units 2Y, 2M, 2C, and 2K are supported to a common support body while various devices disposed around each of the photoconductors 3Y, 3M, 3C, and 3K is deemed as one unit, and the units are detachable from a main body of the image forming apparatus 200. The respective process units 2Y 2M, 2C, and 2K have similar structures except that toner colors to be used are different.

For example, the process unit 2Y for the color Y includes not only the photoconductor 3Y but also a developing device 4Y to develop, into a Y toner image, an electrostatic latent image on the surface of the photoconductor 3Y, a charging device 5Y to uniformly charge a surface of the photoconductor 3Y that is rotationally driven, and a drum cleaning device 6Y to clean transfer residual toner adhering to the surface of the photoconductor 3Y after the photoconductor 3Y passes through a primary transfer nip for the color Y described later. Similarly, the process units 2M, 2C, and 2K for the colors M, C, and K include the photoconductors 3M, 3C, and 3K, developing devices 4M, 4C, and 4K to develop, into M, C, and K toner images, respectively, electrostatic latent images on the surfaces of the photoconductors 3M, 3C, and 3K, charging devices 5M, 5C, and 5K to uniformly charge respective surfaces of the photoconductors 3M, 3C, and 3K that are rotationally driven, and drum cleaning devices 6M, 6C, and 6K to clean transfer residual toner adhering to the surfaces of the photoconductors 3M, 3C, and 3K after the photoconductors 3M, 3C, and 3K pass through respective primary transfer nip regions for the colors M, C, and K described later.

As described above, the process units 2Y, 2M, 2C, and 2K have a substantially identical configuration and functions to each other. Therefore, the following details of the process units 2Y, 2M, 2C, and 2K are occasionally described as a single process unit that corresponds to each of the process units 2Y, 2M, 2C, and 2K, without the suffixes Y, M, C and K indicating respective colors, for example, the process unit 2. It is to be noted that this description is also applied to the photoconductors 3Y, 3M, 3C, and 3K, the developing devices 4Y, 4M, 4C, and 4K, the charging devices 5Y, 5M, 5C, and 5K, and the drum cleaning devices 6Y, 6M, 6C, and 6K.

The image forming apparatus 200 illustrated in FIG. 1 is a so-called tandem type image forming apparatus in which the four process units 2Y, 2M, 2C, and 2K are arranged along an endless movement direction with respect to an intermediate transfer belt 61 that is a rotary body functioning as an intermediate transfer body described later.

As the photoconductor 3 (i.e., the photoconductors 3Y, 3M, 3C, and 3K), a drum-shaped photoconductor on which a photosensitive layer is formed by coating a raw tube of aluminum or the like with a photosensitive organic material is used. However, an endless belt type photoconductor may be also used.

The developing device 4 (i.e., the developing devices 4Y, 4M, 4C, and 4K) develops a latent image by using two-component developer (hereinafter simply referred to as "developer") containing a magnetic carrier and nonmagnetic single-color toner (i.e., yellow, magenta, cyan, and black). As the developing device 4, a developing device of a type that performs development with one-component developer containing no magnetic carrier may also be used instead of the two-component developer. For the developing device 4Y, the Y toner in a Y toner bottle 103Y is suitably supplied by a Y toner supply device. Similarly, for the developing devices 4M, 4C, and 4K, the M, C, and K toner in a M toner bottle 103M, a C toner bottle 103C, and a K toner bottle 103K are suitably supplied by M, C, and K toner supply devices, respectively.

As the drum cleaning device 6Y, a cleaning device having a system that presses a cleaning blade including polyurethane rubber, which is a cleaning member, against the photoconductor 3Y is used, but a cleaning device having a different system may also be used. To improve cleaning performance, this image forming apparatus 200 adopts a system in which a freely-rotatable fur brush is made to contact on the photoconductor 3Y. The fur brush also has roles to scrape off lubricant from solid lubricant, and apply the lubricant to the surface of the photoconductor 3Y while making the lubricant into fine powder.

An electricity discharging lamp is disposed above the photoconductor 3Y, and this electricity discharging lamp also forms a part of the process unit 2Y. After the photoconductor 3Y passes through the drum cleaning device 6Y, this electricity discharging lamp electrically discharges the surface of the photoconductor 3Y by irradiation with light.

The electrically discharged surface of the photoconductor 3Y is uniformly charged by the charging device 5Y and then subjected to the optical scanning by the above-described optical writing unit 1YM. The charging device 5Y is rotationally driven while receiving supply of charging bias from a power source. Here, a scorotron charger system that performs charging processing in a manner not contacting the photoconductor 3Y may also be adopted instead of the above-described system.

The process unit 2Y for the color Y has been described above, but the process units 2M, 2C, and 2K for the colors M, C, and K also have structures similar to the structure of the process unit for the color Y.

The transfer unit 60 is disposed below the four process units 2Y, 2M, 2C, and 2K. In the transfer unit 60, the intermediate transfer belt 61 that is an endless belt stretched over a plurality of support rollers including support rollers 63 and 69, is made to travel in a clockwise direction (endless movement) in FIG. 1 by rotational drive of any one of the support rollers while making the intermediate transfer belt 61 contact the photoconductors 3Y, 3M, 3C, and 3K. Consequently, primary transfer nips for the colors Y, M, C and K, where the photoconductors 3Y, 3M, 3C, and 3K contact the intermediate transfer belt 61, are formed.

In vicinities of the primary transfer nips for the colors Y, M, C, and K, the intermediate transfer belt 61 is pressed against the photoconductors 3Y, 3M, 3C, and 3K by primary transfer rollers 62Y, 62M, 62C, and 62K as primary transfer members disposed inside a belt loop surrounded by an inner circumferential surface of the intermediate transfer belt 61. These primary transfer rollers 62Y, 62M, 62C, and 62K are respectively applied with primary transfer bias from the power source. Consequently, a primary transfer electric field to electrostatically move a toner image on each of the photoconductors 3Y, 3M, 3C, and 3K toward the intermediate transfer belt 61 is formed at each of the primary transfer nips for Y, M, C, and K.

In FIG. 1, the toner images are sequentially superimposed, at the respective primary transfer nips, on an outer circumferential surface of the intermediate transfer belt 61 that sequentially passes through the primary transfer nips for the colors Y, M, C, and K along with the endless movement in the clockwise direction. A four-color superposed toner image (hereinafter referred to as "four-color toner image") is formed on the outer circumferential surface of the intermediate transfer belt 61 by primary transfer of this superimposition.

A secondary transfer roller 72 as a secondary transfer member is disposed under the intermediate transfer belt 61 in FIG. 1. The secondary transfer roller 72 contacts, from the outer circumferential surface of the intermediate transfer belt 61, a place where the intermediate transfer belt 61 is hooked around a secondary transfer backup roller 68 so as to form the secondary transfer nip. Consequently, the secondary transfer nip where the outer circumferential surface of the intermediate transfer belt 61 contacts the secondary transfer roller 72 is formed.

The secondary transfer roller 72 is applied with secondary transfer bias from the power source. On the other hand, the secondary transfer backup roller 68 inside the belt loop is grounded. Consequently, a secondary transfer electric field is formed in the secondary transfer nip.

The above-described pair of registration rollers 34 is disposed on a right side of the secondary transfer nip in FIG. 1, and a recording sheet P sandwiched between the registration roller pair is fed to the secondary transfer nip at timing synchronized with the four-color toner image on the intermediate transfer belt 61. In the secondary transfer nip, the four-color toner image on the intermediate transfer belt 61 is secondarily transferred to the recording sheet P at a time by influence of the secondary transfer electric field and nip pressure, and a full color image is formed in combination with white color of the recording sheet P.

Transfer residual toner that has not been transferred to the recording sheet P at the secondary transfer nip adheres to the outer circumferential surface of the intermediate transfer belt 61 having passed through the secondary transfer nip. Such transfer residual toner is cleaned by a belt cleaning device 75 contacting the intermediate transfer belt 61.

The recording sheet P having passed through the secondary transfer nip is separated from the intermediate transfer belt 61 and delivered to the conveyance belt unit 35. The conveyance belt unit 35 endlessly moves a conveyance belt 36 having an endless loop in the counterclockwise direction in FIG. 1 with rotational drive of a drive roller 37 while the conveyance belt 36 is stretched over the drive roller 37 and a driven roller 38. Then, the recording sheet P delivered from the secondary transfer nip is conveyed along with endless movement of the conveyance belt 36 while being held on the outer circumferential surface (stretched surface) of the conveyance belt 36, and the recording sheet P is delivered to the fixing device 40 as a fixing unit.

The image forming apparatus 200 includes a refeeder including the conveyance switching device 50, a refeeding passage 54, a switchback passage 55, a post-switchback conveyance passage 56, and the like. Specifically, the conveyance switching device 50 switches, between the sheet ejection passage 51 and the refeeding passage 54, a subsequent conveyance destination of the recording sheet P received from the fixing device 40.

In a case of executing a one-sided mode print job in which an image is formed on a first surface of a recording sheet P alone, the conveyance destination of the recording sheet P is set to the sheet ejection passage 51. Consequently, the recording sheet P on which the image is formed on the first surface alone is fed to the sheet ejection roller pair 52 via the sheet ejection passage 51 and ejected onto the sheet ejection tray 53 outside the apparatus.

In a case of executing a double-sided mode print job in which an image is formed in each of both surfaces of a recording sheet P, the conveyance destination of the recording sheet P is also set to the sheet ejection passage 51 when the recording sheet P on which images are formed on both sides respectively is received from the fixing device 40. Consequently, the recording sheet P on which the images have been formed on both surfaces is ejected onto the sheet ejection tray 53 outside the apparatus.

On the other hand, in the case of executing the double-sided mode print job, the conveyance destination of the recording sheet P is set to the refeeding passage 54 when the recording sheet P on which an image is fixed on the first surface alone is received from the fixing device 40.

The refeeding passage 54 is linked to the switchback passage 55, and the recording sheet P fed to the refeeding passage 54 enters this switchback passage 55. Then, when an entire region in the conveyance direction of the recording sheet P enters the switchback passage 55, the conveyance direction of the recording sheet P is reversed and the recording sheet P is switched back. The switchback passage 55 is linked not only to the refeeding passage 54 but also to the post-switchback conveyance passage 56, and the recording sheet P that has been switched back enters the post-switchback conveyance passage 56 to inverse an upper side and a lower side of the recording sheet P. Then, the vertically-inverted recording sheet P is refed to the secondary transfer nip via the post-switchback conveyance passage 56 and the sheet feeding passage 30. The recording sheet P on which a toner image has been also transferred to a second surface at the secondary transfer nip has the toner image fixed on the second surface via the fixing device 40, and then ejected onto the sheet ejection tray 53 via the conveyance switching device 50, the sheet ejection passage 51, and the sheet ejection roller pair 52.

Figure 2:
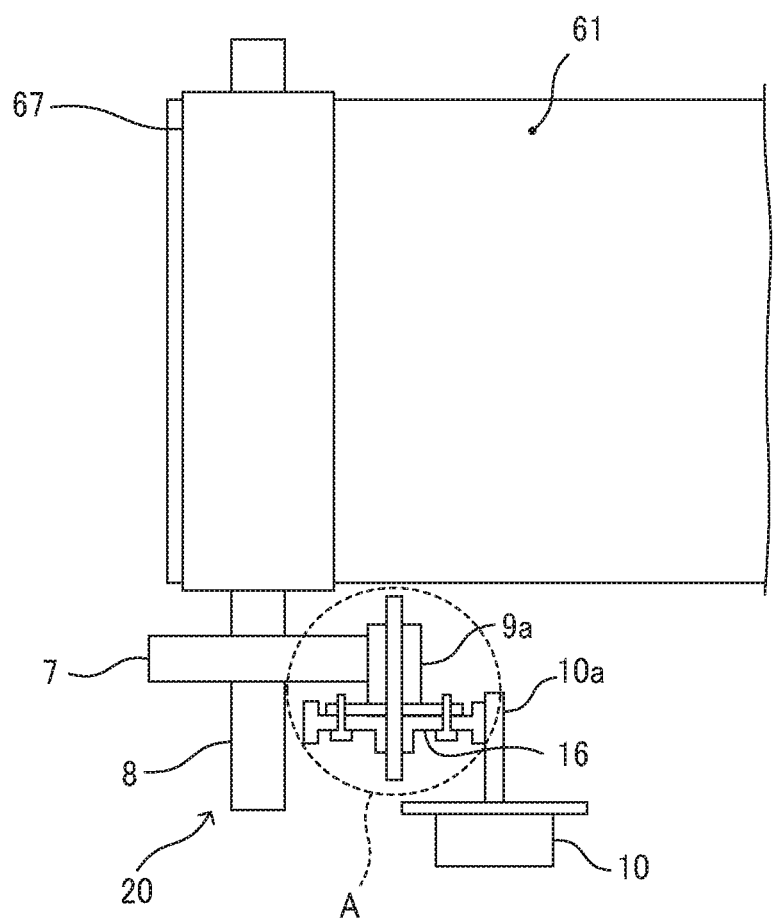
FIG. 2 is a schematic structural view of a driver to drive an intermediate transfer belt.

FIG. 2 is a schematic structural view of a driver 20 that drives the intermediate transfer belt 61.

The driver 20 mainly includes a drive motor 10 as a drive source, a first gear 16 as a first drive transmitter to be meshed with a motor gear 10a of the drive motor, a second gear 9a provided coaxially with the first gear 16, and a central rotation gear 7 to be meshed with the second gear 9a that functions as a press-fit member and provided at a shaft 8 of a drive roller 67 that is one of the support rollers supporting the intermediate transfer belt 61.

A drive force of the drive motor is transmitted to the first gear 16 via the motor gear 10a, and then transmitted from the first gear 16 to the second gear 9a. Furthermore, the drive force is transmitted from the second gear 9a to the central rotation gear 7 and the drive roller 67 is rotationally driven to rotationally drive the intermediate transfer belt 61.

The intermediate transfer belt 61 is applied with large load torque when a thick sheet enters the secondary transfer nip. Since the large load torque is thus applied, metal having a high Young's modulus (rigidity) is preferably included as a gear forming the driver 20. However, when all of the gears include the metal, vibration becomes larger and noise becomes louder because rigid objects are meshed with each other. Therefore, not all of the gears include the metal.

The smaller a diameter is, the larger the torque applied to teeth is. Accordingly, the torque applied to the second gear 9a having a smallest diameter among diameters of the first gear 16, the second gear 9a, and the central rotation gear 7 is large, and the second gear 9a has a high risk of being damaged. Therefore, in the present embodiment, the second gear 9a includes the metal and has the Young's modulus (rigidity) higher (greater) than the Young's moduli of other gears. Thus, since the second gear 9a includes the metal, the central rotation gear 7 includes a resin material having lower (smaller) hardness and a lower (smaller) Young's modulus than hardness and the Young's modulus of the second gear 9a. Consequently, mesh vibration between the second gear 9a and the central rotation gear 7 can be absorbed by the central rotation gear 7 including the resin material, and occurrence of vibration and noise can be restrained. Additionally, since the motor gear 10a is formed by cutting a metal motor shaft, the first gear 16 also includes the resin material having the lower (smaller) hardness and the lower (smaller) Young's modulus than the hardness and the Young's modulus of the second gear 9a. Consequently, mesh vibration between the motor gear 10a and the first gear 16 can be absorbed by the first gear 16 including the resin material, and vibration and noise can be restrained.

Thus, in the present embodiment, since the first gear 16 and the second gear 9a include the different materials, the first gear 16 and the second gear 9a are formed by integral resin molding. It is also conceivable to integrally mold the second gear 9a including the metal and the first gear 16 including the resin material by insert molding. However, in a comparative drive transmission device, a manufacturing process is complicated.

Accordingly, it is also conceivable that the first gear 16 and the second gear 9a are respectively press-fitted into a metal shaft rotatably supporting the first gear 16 and the second gear 9a, and transmit, via the metal shaft, the drive force that has been transmitted to the first gear 16 to the second gear 9a.

However, since thermal expansion of the first gear 16 including the resin is larger than thermal expansion of the metal shaft, coupling force between the first gear 16 and the metal shaft may be decreased and the first gear 16 may idle around the metal shaft when a temperature rises. On the other hand, in a case where a shaft into which the first gear 16 and the second gear 9a are press-fitted is a resin shaft, engagement force between the resin shaft and the second gear 9a including the metal may be too strong and the resin shaft may be cracked when the temperature rises.

Additionally, it is also conceivable to insert a drive pin into the metal shaft into which the second gear 9a is press-fitted so that drive transmission can be performed between the first gear 16 and the metal shaft via the drive pin. Furthermore, it is also conceivable to form, into a D shape, a cross-sectional shape of a through hole through which the metal shaft of the first gear 16 passes, and further form, into a D shape, a cross-sectional shape of a portion of the metal shaft inserted into this through hole so that drive transmission can be performed between the first gear 16 and the metal shaft. However, in these cases, load torque is applied to a position close to an axial center of the first gear 16 including the resin material, and the load torque applied to the first gear is increased. As a result, there is a problem that the first gear 16 including the resin material and having weak rigidity is distorted (twisted) in the rotation direction, and the rotation accuracy is degraded.

Therefore, in the present embodiment, the first gear 16 is fastened to the second drive transmitter 9 including the second gear 9a so that the drive force of the drive motor 10 that functions as a drive source is transmitted from the first gear 16 to the second drive transmitter. The first gear 16 is the first drive transmitter including the resin material having the lower (smaller) hardness, the lower (smaller) Young's modulus, and a higher thermal expansion coefficient than the hardness, the Young's modulus, and a thermal expansion coefficient of the second drive transmitter 9 including the metal.

Figure 3:
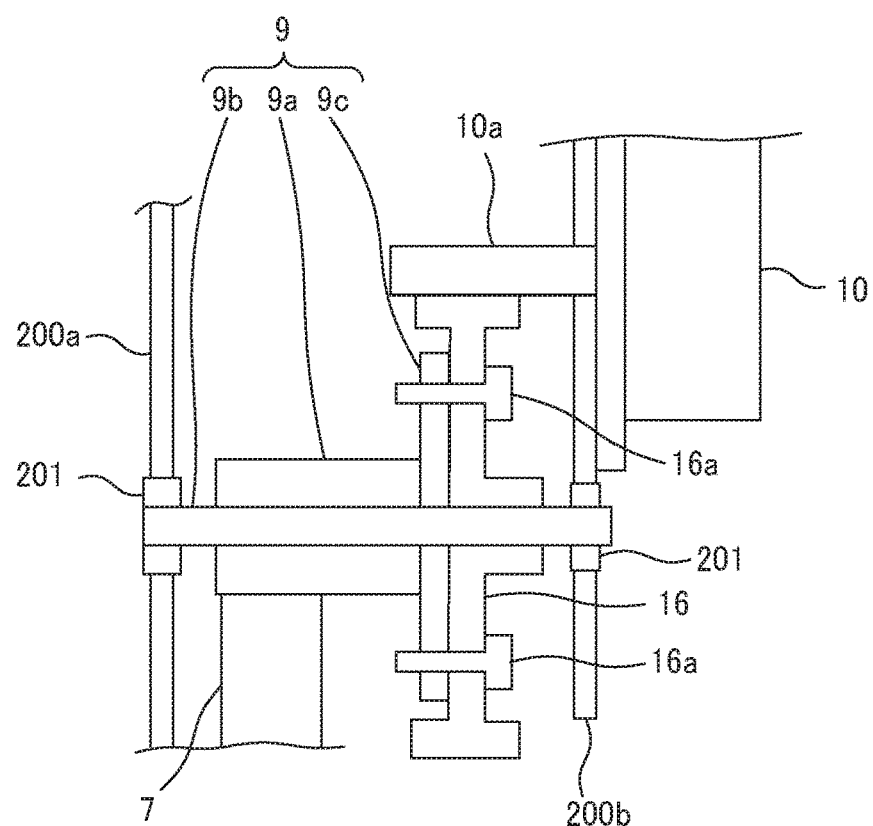
FIG. 3 is an enlarged view of a portion A in FIG. 2.
Figure 4:
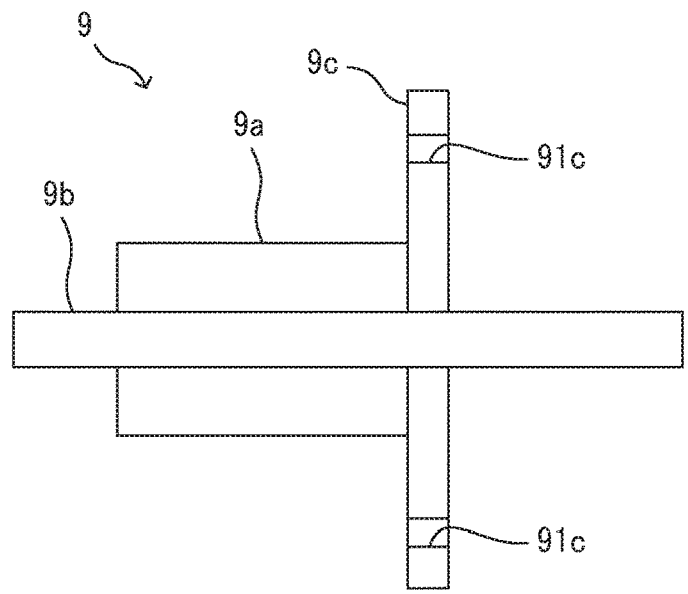
FIG. 4 is a schematic structural view illustrating a second drive transmitter.

FIG. 3 is an enlarged view of a portion A in FIG. 2, and FIG. 4 is a schematic structural view illustrating the second drive transmitter 9.

As illustrated in FIG. 4, the second drive transmitter 9 includes a metal shaft 9b, the second gear 9a as a press-fit member to be press-fitted into the metal shaft 9b and including the metal, and a fastening target member 9c as a press-fit member to be press-fitted into the metal shaft 9b and including a metal plate. The fastening target member 9c has an inner circumferential surface on which a plurality of screw holes 91c each formed with a screw groove is formed at equal intervals in the rotation direction.

Additionally, the metal shaft 9b is rotatably supported to a motor holding side plate 200b and a main body side plate 200a via respective bearings 201.

The first gear 16 that is the first drive transmitter is fastened to the fastening target member 9c by a screw 16a as a fastening member. Additionally, in the present embodiment, the first gear 16 is fastened while interposing a spring washer between a head of the screw 16*a* and the first gear 16 so as to obtain high fastening force.

In the present embodiment, the drive force of the drive motor 10 having been transmitted to the first gear 16 is transmitted to the fastening target member 9*c*. Specifically, the drive force is transmitted from the first gear 16 to the fastening target member 9*c* by static frictional force around a fastening place (around a place where the screw 16*a* passes through) in a contact portion between the first gear 16 and the fastening target member 9*c* on which the fastening force acts. Then, the drive force is transmitted from the fastening target member 9*c* to the second gear 9*a* via the metal shaft 9*b*.

When the first gear 16 including the resin material thermally expands due to temperature rise, such thermal expansion of the first gear 16 acts in a direction to increase the fastening force of the screw 16*a*. Consequently, even a member to which the drive force is transmitted from the first gear 16 has a thermal expansion coefficient lower (smaller) than the thermal expansion coefficient of the first gear 16, the drive force can also be transmitted excellently from the first gear 16 to the second drive transmitter 9 even at the time of temperature rise.

Additionally, in the present embodiment, the fastening place on an outer circumferential surface (in other words, a drive transmission surface) of the first gear 16 by the screw 16*a* is provided more on an outer side than an outer circumferential surface (in other words, a drive transmission surface) of the second gear 9*a*. Consequently, a place to receive the load torque can be set more distant from the axial center than in the case where the drive force is transmitted between the first gear 16 and the second drive transmitter 9 by the drive pin, and the load torque applied to the first gear 16 can be reduced. Consequently, the first gear 16 is restrained from being distorted (twisted), and degradation in rotation accuracy can be restrained.

Therefore, the driver 20 of the present embodiment can restrain mesh vibration and noise, improve durability of the driver, and further restrain degradation in the rotation accuracy.

Also, it is preferable that the first gear 16 be lightly press-fitted into the metal shaft 9*b*. Since the first gear 16 is lightly press-fitted, centering can be performed excellently, and eccentricity of the first gear 16 can be restrained excellently. Additionally, deviation relative to rotation of the metal shaft 9*b* can also be restrained, and degradation in rotation accuracy can be restrained. Furthermore, since the fastening target member 9*c* and the second gear 9*a* are directly press-fitted into the metal shaft 9*b*, centering can be performed excellently, and eccentricity can be restrained excellently. Consequently, degradation in rotation accuracy in each of the fastening target member 9*c* and the second gear 9*a* is also restrained.

Figure 5:
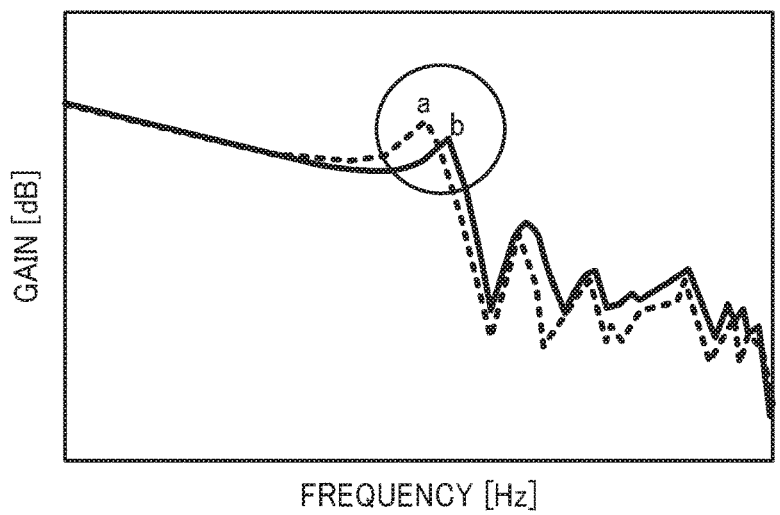
FIG. 5 is a graph comparing a gain characteristic of frequency response of the driver in the present embodiment with a gain characteristic of frequency response of a driver in a comparative example.

FIG. 5 is a graph comparing a gain characteristic of frequency response of the driver 20 in the present embodiment with a gain characteristic of frequency response of a driver in a comparative example in which the first gear 16, the second gear 9*a*, and the central rotation gear 7 each include the resin material.

In FIG. 5, a solid line represents the gain characteristic of the frequency response of the driver 20 of the present embodiment, and a broken line in FIG. 5 represents the gain characteristic of the frequency response of the driver of the comparative example.

As illustrated in FIG. 5, it is found that a resonance frequency at a resonance point b (frequency: 64 [Hz], gain 30 [dB]) of the driver 20 of the present embodiment represented by the solid line in FIG. 5 is higher (greater) than a resonance frequency at a resonance point a (frequency: 57 [Hz], gain: 34 [dB]) of the comparative example represented by the broken line in FIG. 5.

From this fact, it is found that rigidity of a rotation system in the driver 20 of the present embodiment is higher (greater) than rigidity of a rotation system in the driver of the comparative example.

Figure 6A:
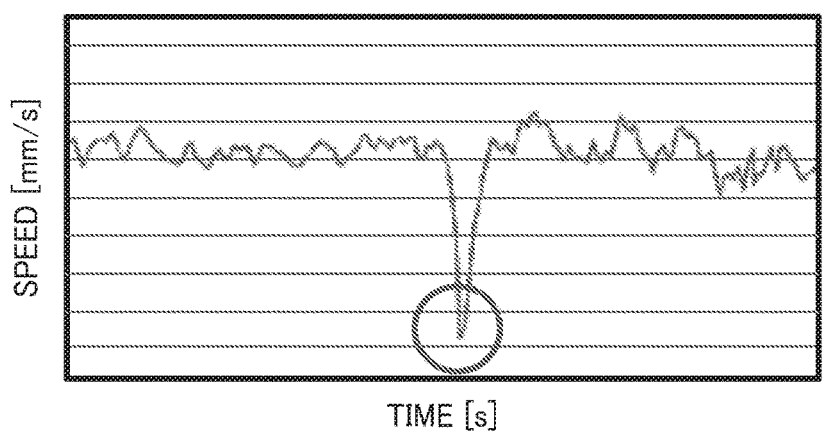
FIGS. 6A and 6B are graphs in which speed fluctuation is examined when disturbance (load) is applied at prescribed time from start of driving at the time of driving the intermediate transfer belt.
Figure 6B:
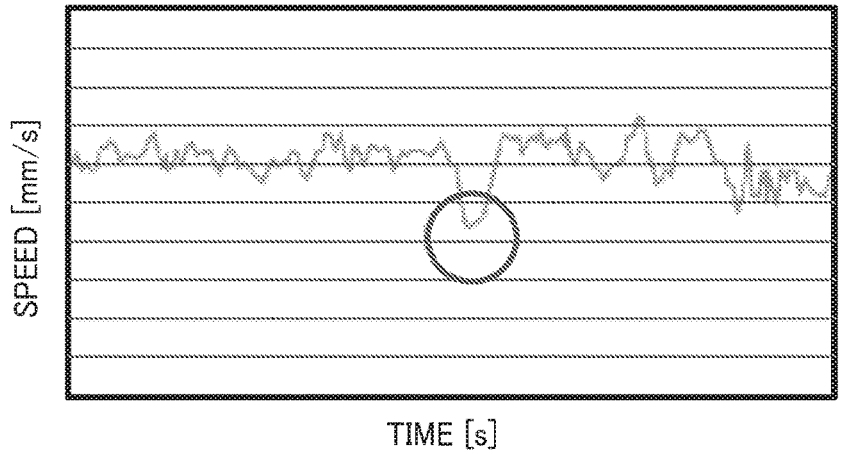

FIGS. 6A and 6B are graphs in which speed fluctuation is examined when disturbance (load) is applied at prescribed time from start of driving at the time of driving the intermediate transfer belt.

FIG. 6A is the graph illustrating the speed fluctuation of the intermediate transfer belt at the time of using the driver of the comparative example in which the first gear 16, the second gear 9*a*, and the central rotation gear 7 each include the resin material, and FIG. 6B is the graph illustrating the speed fluctuation of the intermediate transfer belt at the time of using the driver 20 of the present embodiment.

As it is found from comparison between FIG. 6A and FIG. 6B, the speed fluctuation at the time of applying the disturbance (load) can be more restrained in the case of using the driver of the present embodiment than in the case of using the driver of the comparative example. It can be considered that the driver of the present embodiment can restrain the speed fluctuation of the intermediate transfer belt at the time of applying the disturbance (load) because rigidity of the rotation system can be made higher (greater) than rigidity of the driver of the comparative example.

Thus, since the driver 20 of the present embodiment is used, the speed fluctuation of the intermediate transfer belt can be restrained when, for example, a thick sheet or the like enters the secondary transfer nip. Additionally, generation of an abnormal image, such as banding, can be restrained.

Next, Modified Examples of the present embodiment will be described.

Modified Example 1

Figure 7:
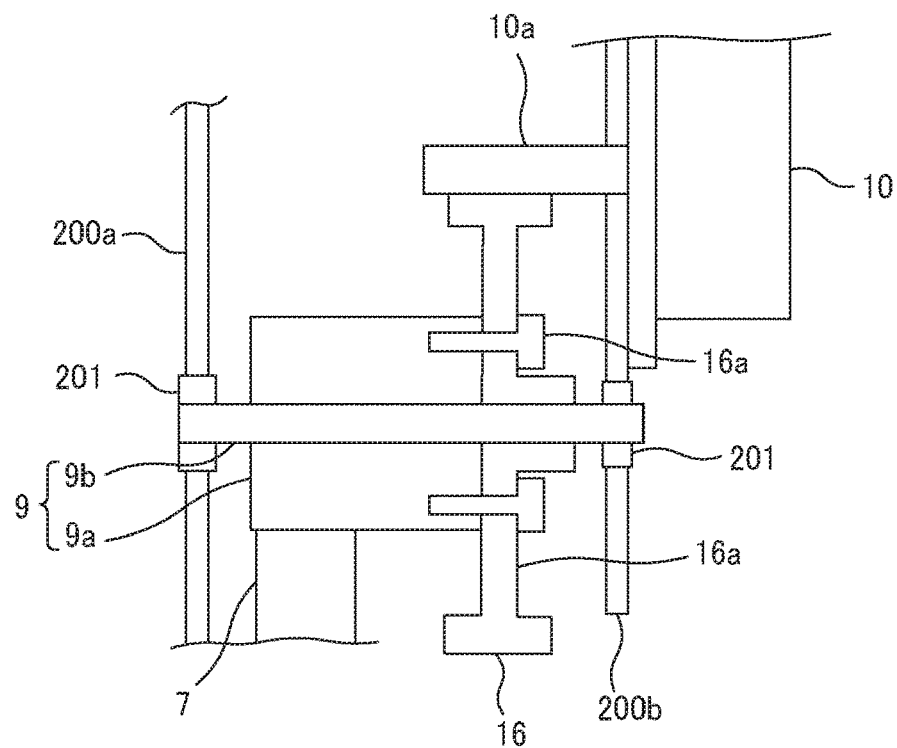
FIG. 7 is an enlarged structural view of the main portion of the driver in Modified Example 1.

FIG. 7 is an enlarged structural view of the main portion of the driver in Modified Example 1.

In this Modified Example 1, the first gear 16 is fastened to the second gear 9*a*. Since the first gear 16 is thus fastened to the second gear 9*a*, the number of the fastening target members can be reduced, and cost of the device can be cut down by reduction of the number of parts. On the other hand, the fastening place is closer to the axial center than in the driver of the above embodiment, and the effect of restraining distortion (twist) of the first gear 16 caused by load torque is decreased. Therefore, this Modified Example 1 is preferably used in a place where the load torque is small.

Modified. Example 2

Figure 8:
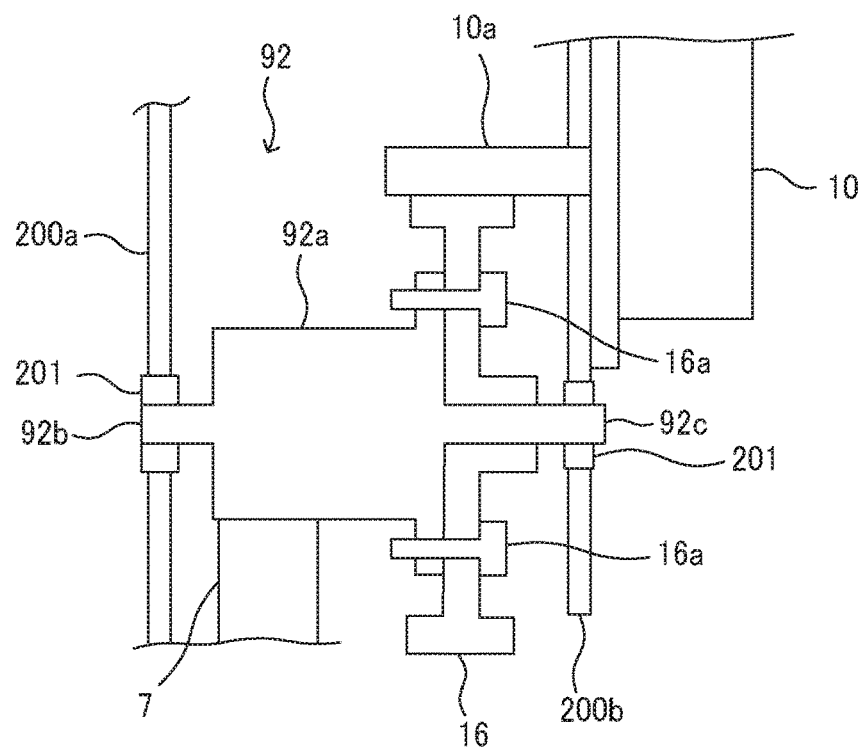
FIG. 8 is an enlarged structural view of the main portion of the driver in Modified Example 2.

FIG. 8 is an enlarged structural view of the main portion of the driver in Modified Example 2.

In this Modified Example 2, the second drive transmitter includes a single member. In other words, in this Modified Example 2, a metal member 92 including metal includes a second gear portion 92*a* meshed with the central rotation gear 7 including the resin material, a shaft portion 92*b* rotatably supported to the motor holding side plate 200*b* and the main body side plate 200*a* via the bearings 201 respectively, and a fastening target portion 92*c* to which the first gear 16 including the resin material is fastened. The metal member 92 functions as a transmitter forming member.

Thus, since the second drive transmitter includes the single member, the cost of the device can be cut down by reduction of the number of parts. Additionally, the press-fit member is eliminated and assembly can be more simplified.

Modified Example 3

Figure 9:
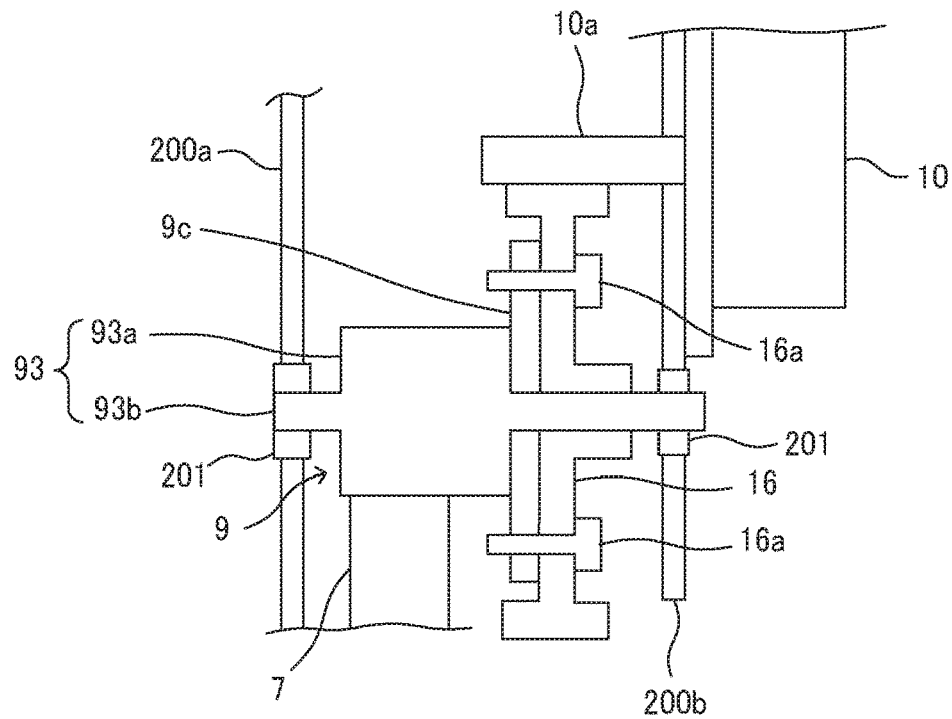
FIG. 9 is an enlarged structural view of the main portion of the driver in Modified Example 3.

FIG. 9 is an enlarged structural view of the main portion of the driver in Modified Example 3.

In this Modified Example 3, the second drive transmitter 9 includes a metal member 93 including a shaft portion 93b and a second gear portion 93a, and the fastening target member 9c. In this Modified Example 3, the metal shaft 9b can be reduced, and the cost of the device can be cut down by reduction of the number of parts. Additionally, compared to the Modified. Example 2, a place to which the first gear 16 is fastened can be more easily formed outside the second gear portion 93a. The metal member 93 functions as a transmitter forming member.

Modified Example 4

Figure 10:
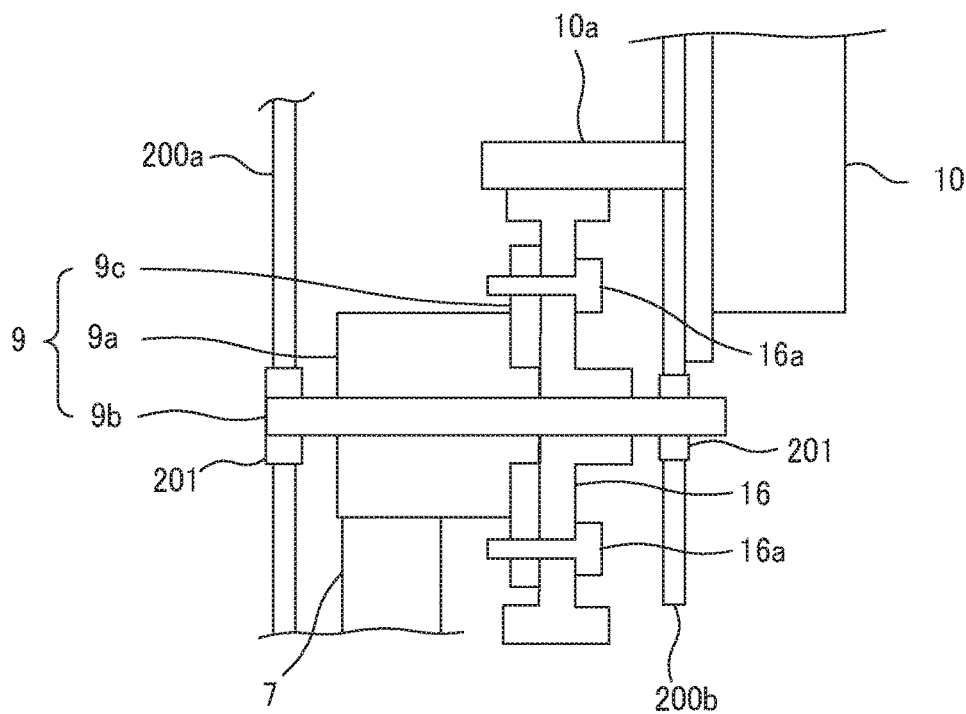
FIG. 10 is an enlarged structural view of the main portion of the driver in Modified Example 4.

FIG. 10 is an enlarged structural view of the main portion of the driver in Modified Example 4.

In this Modified Example 4, the fastening target member 9c is press-fitted into the second gear 9a. In this Modified Example 4, the drive force of the drive motor 10 can be transmitted to the second gear 9a not via the metal shaft 9b. Additionally, in this Modified Example 4, the second gear 9a is press-fitted into the metal shaft 9b to rotatably support the metal shaft 9b to the motor holding side plate 200b and the main body side plate 200a via the bearings 201 respectively. However, the metal shaft may be supported not rotatably to the motor holding side plate 200b and the main body side plate 200a, and the second gear 9a may be rotatably supported to the metal shaft.

Modified Examples 5 and 6

Figure 11A:
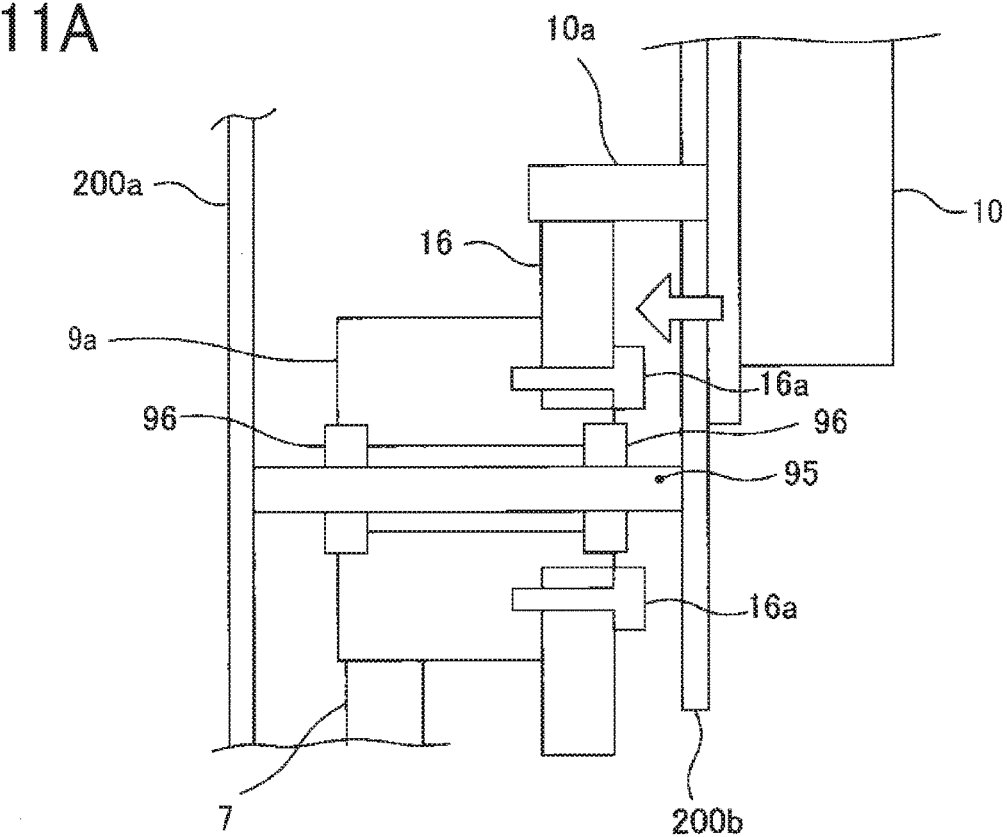
FIGS. 11A and 11B are enlarged structural views of the main portion of the driver in Modified Example 5.
Figure 11B:
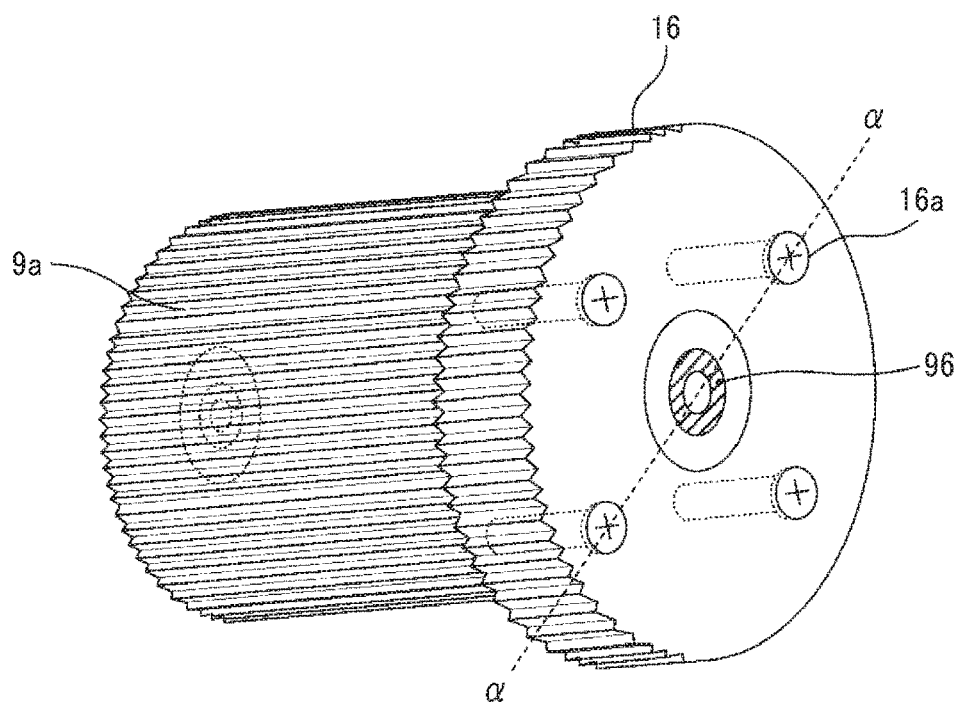
Figure 12A:
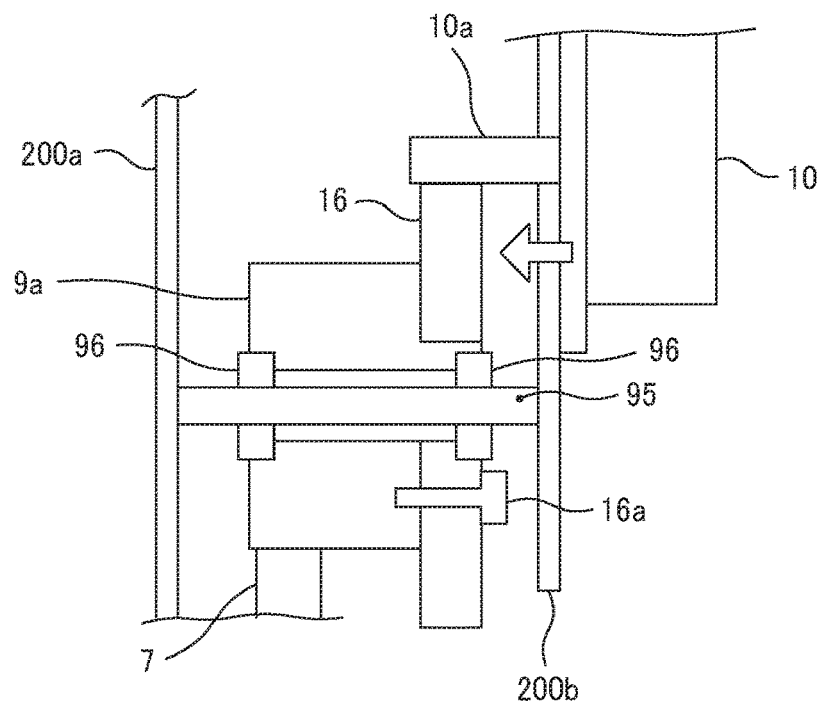
FIGS. 12A and 12B are enlarged structural views of the main portion of the driver in Modified Example 6.
Figure 12B:
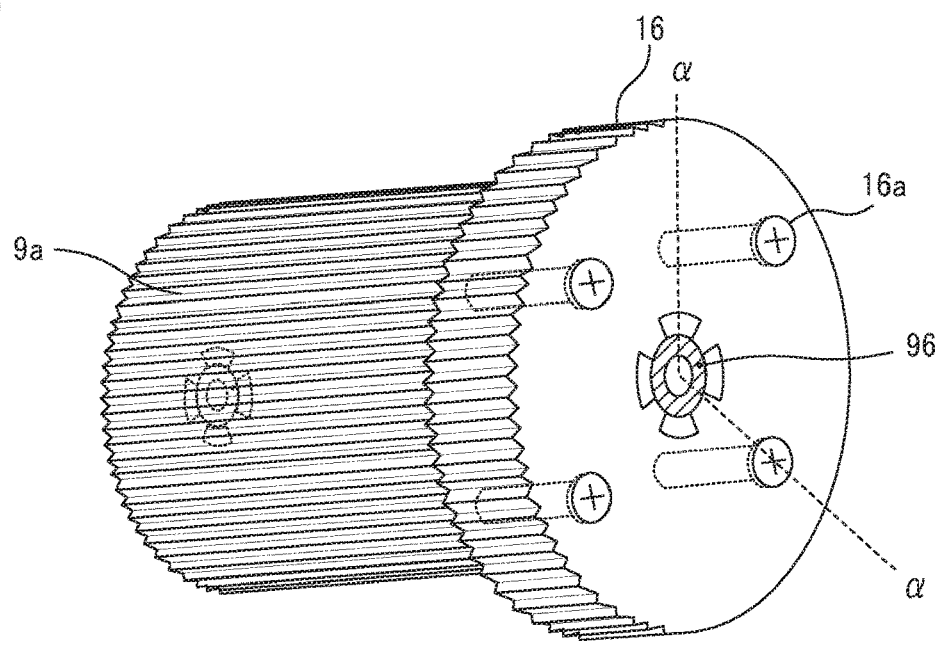

FIGS. 11A and 11B are enlarged structural views of the main portion of the driver in Modified Example 5, and FIGS. 12A and 12B are enlarged structural views of the main portion of the driver in Modified Example 6.

FIGS. 11A and 12A are schematic cross-sectional views, and FIGS. 11B and 12B are schematic perspective views. Note that FIG. 11A is the cross-sectional view taken along a broken line α in FIG. 11B, and FIG. 12A is the cross-sectional view taken along the broken line α in FIG. 12B.

In these Modified Examples 5 and 6, the second gear 9a is rotatably supported to a fixed shaft 95 via a bearing 96, and the second gear 9a is press-fitted into a bearing 96. In the Modified Example 5, the first gear 16 is inserted into the second gear 9a and fastened to the second gear 9a. In the Modified Example 5, a step is provided on the second gear 9a and the first gear 16 is fitted into the stepped surface of the second gear 9a. However, an inclined surface may also be provided on the second gear 9a and the first gear 16 may be fitted into the inclined surface.

On the other hand, in the Modified Example 6, the inner circumferential surface of the through hole of the first gear 16 has a shape including protrusion and recesses, and a cut-away groove is provided in a place of the second gear 9a to be press-fitted into a bearing on the drive motor side. Then, each of the protrusions of the through hole is inserted into the cut-away groove to also press-fit the first gear 16 into the bearing on the drive motor side. In the Modified Example 6, since the first gear is press-fitted into the bearing into which the second gear 9a is press-fitted, eccentricity and deflection can be restrained excellently, and degradation in rotation accuracy can be restrained.

Figure 13:
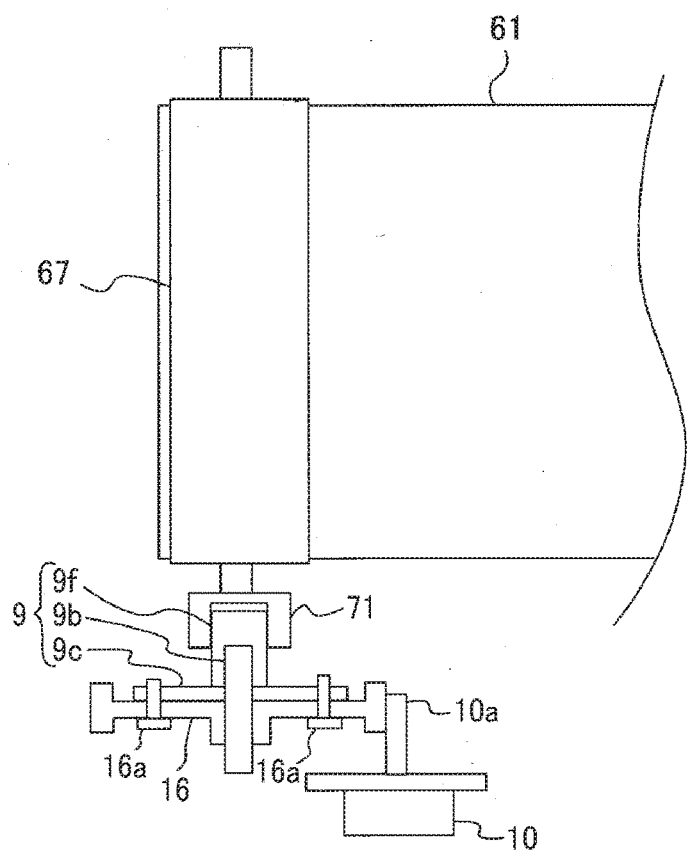
FIG. 13 is a view to describe a modified example of the second drive transmitter.
Figure 14:
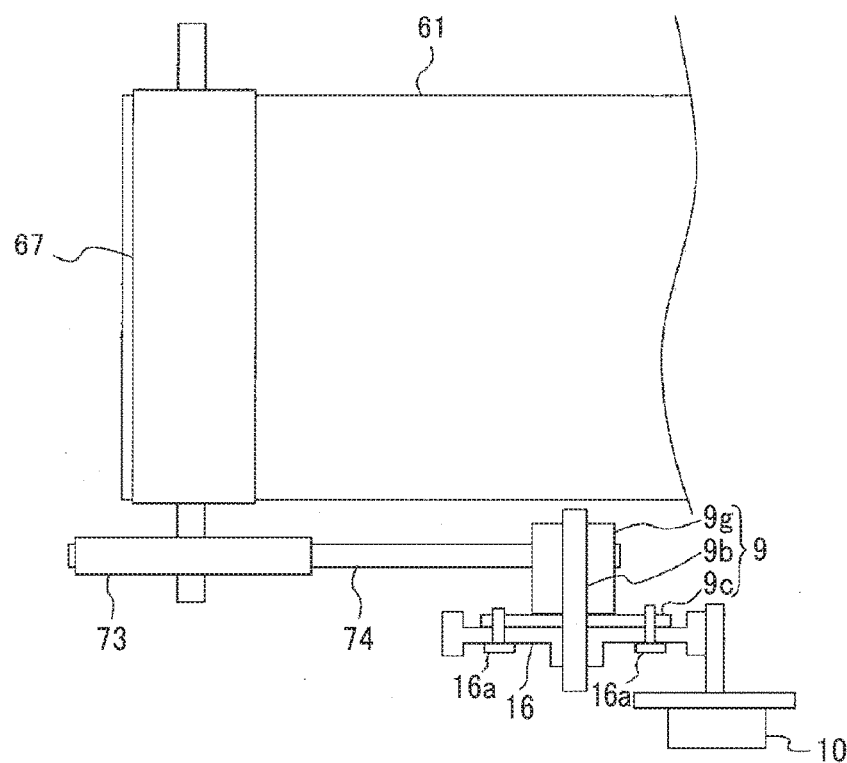
FIG. 14 is a view to describe another modified example of the second drive transmitter.
Figure 15:
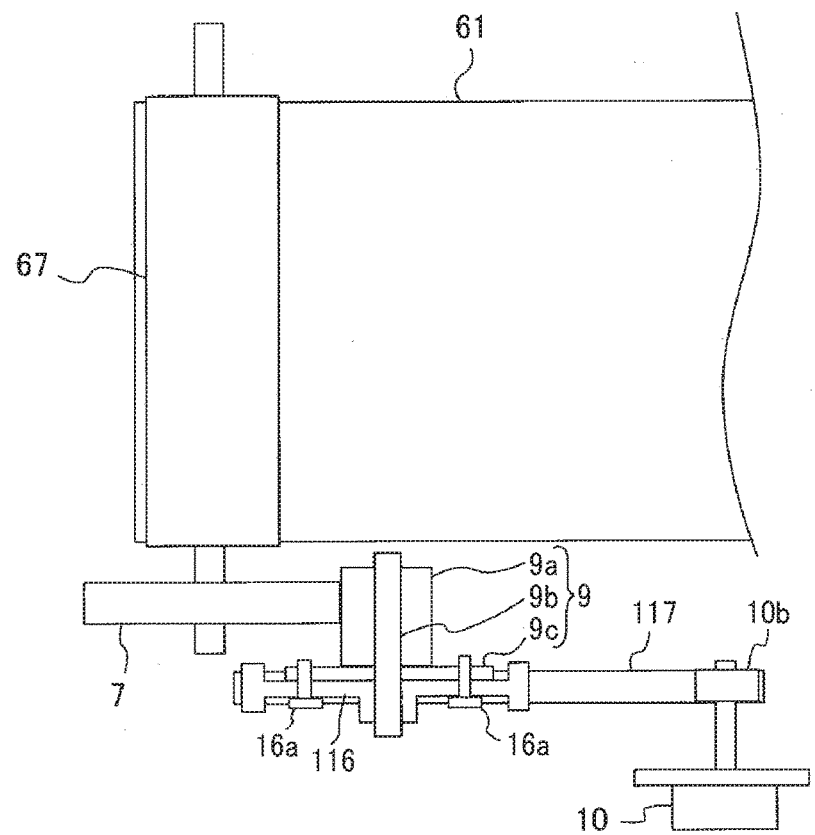
FIG. 15 is a view illustrating an example in which a driven pulley is used as the first drive transmitter.
Figure 16:
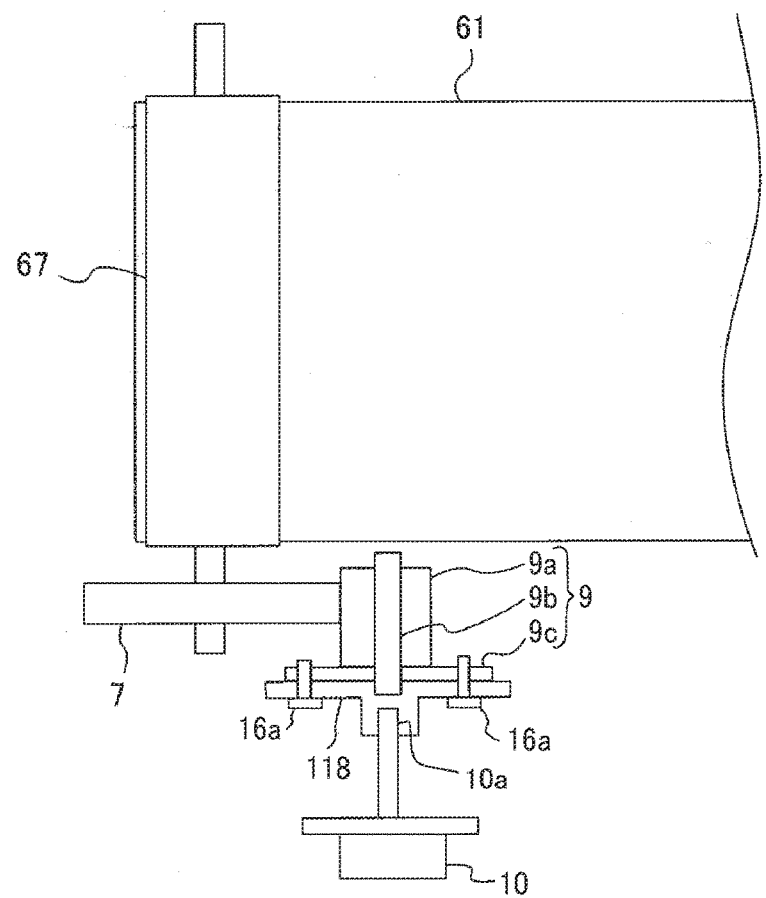
FIG. 16 is a view illustrating an example in which a joint is used as the first drive transmitter.

Additionally, while the second drive transmitter may include the gear in the above description, the second drive transmitter may also include a joint 9f instead of the gear as illustrated in FIG. 13. The joint 9f is inserted into a driven-side joint 71, which is provided at a shaft end portion of the drive roller 67, to establish drive connection. Furthermore, as illustrated in FIG. 14, the second drive transmitter may include a pulley 9g where a timing belt 74 is wound around. The timing belt 74 is wounded around a driven-side pulley 73 provided at the shaft of the drive roller 67. Similarly, as illustrated in FIG. 15, the first drive transmitter may include, instead of the first gear, a pulley 116 that stretches a drive timing belt 117 in cooperation with a drive pulley 10b provided at the motor shaft. Additionally, as illustrated in FIG. 16, the first drive transmitter may include a joint 118 into which the motor gear 10a at a tip of the motor shaft is inserted.

Figure 17:
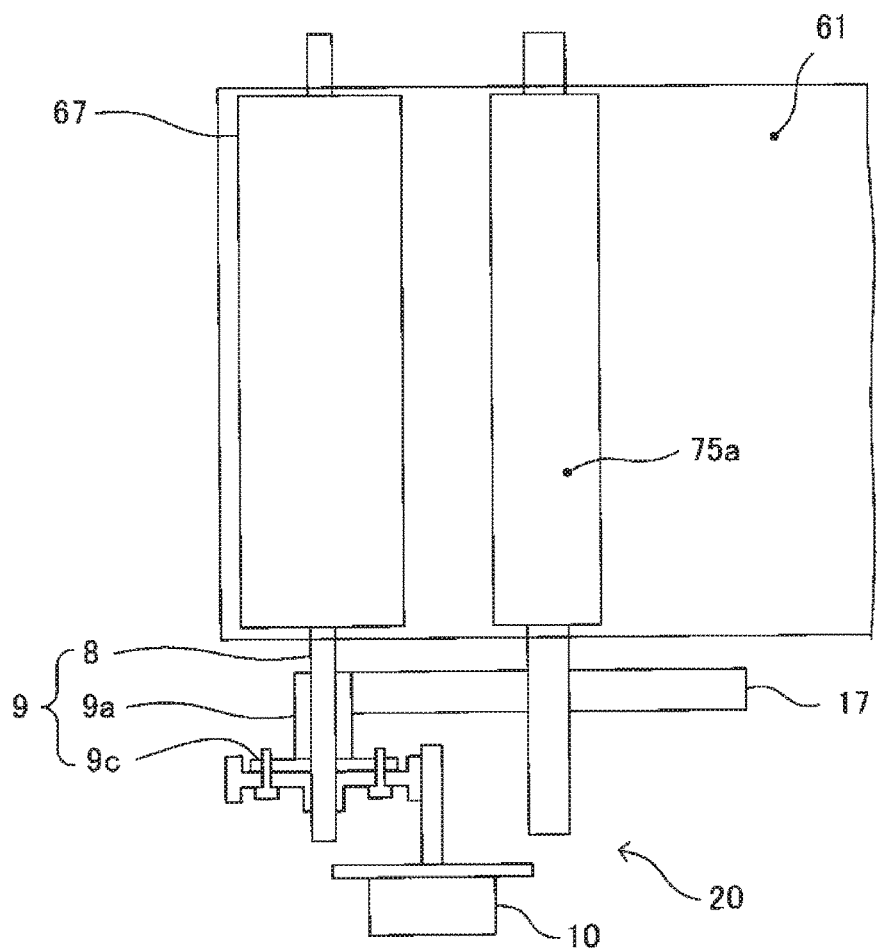
FIG. 17 is a view illustrating an example in which the second drive transmitter includes a shaft of a drive roller, a second gear, and a fastening target member.

Furthermore, as illustrated in FIG. 17, the second drive transmitter 9 may include the shaft 8 of the drive roller, the second gear 9a, and the fastening target member 9c. In the structure illustrated in FIG. 17, the second gear 9a is meshed with a cleaning gear 17 provided at a shaft of a belt cleaning roller 75a of the belt cleaning device 75. The driver illustrated in FIG. 17 drives the intermediate transfer belt 61 and the belt cleaning roller 75a.

Figure 18:
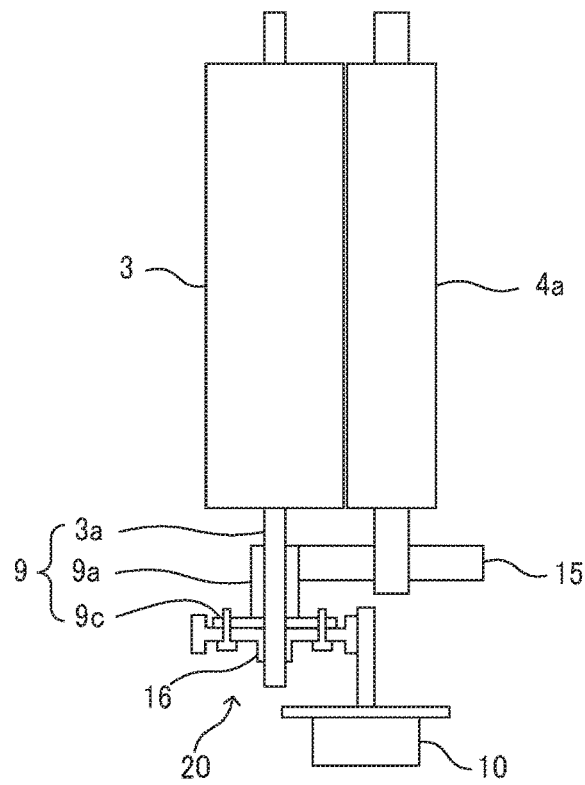
FIG. 18 is a view illustrating an example in which the second drive transmitter includes a shaft of a photoconductor, the second gear, and the fastening target member.

Additionally, a rotary body to be driven by this driver 20 is not limited to the intermediate transfer belt. For example, as illustrated in FIG. 18, the second drive transmitter 9 may include a shaft 3a of the photoconductor 3, the second gear 9a, and the fastening target member 9c, and the second gear 9a may be meshed with a developing gear 15 attached to a shaft of a developing roller 4a to drive the photoconductor 3 and the developing roller 4a. Additionally, examples of the rotary body to be driven by this driver 20 may include the secondary transfer roller 72, a cleaning roller of each of the drum cleaning devices 6, a conveyance roller to convey a recording sheet P, a developer stirring screw, a waste toner conveyance screw, a fixing roller, and the like.

The matters described above are merely examples, and specific effects are exerted in each of the following aspects.

Aspect 1.

A drive transmission device such as the driver 20 includes a drive source such as the drive motor 10 that generates a drive force, a first drive transmitter such as the first gear 16, and a second drive transmitter 9 coaxially arranged with the first drive transmitter and including a material different from a material of the first drive transmitter. The drive transmission device transmits the drive force of the drive source such as the drive motor 10 between the first drive transmitter and the second drive transmitter, in which the first drive transmitter is fastened to the second drive transmitter.

In the comparative drive transmission device, a load torque is applied to the plurality of protrusions on the inner circumferential surface of the press-fit hole portion of the first drive transmitter, in which drive transmission is performed between the first drive transmitter and the second drive transmitter. Since the plurality of protrusions is located close to the axial center, the load torque applied to the plurality of protrusions is large. As a result, when the large load torque is applied, the first drive transmitter is twisted in the rotation direction, and the rotation accuracy is degraded.

In the aspect 1, since the first drive transmitter is fastened to the second drive transmitter, the drive force of the drive source is transmitted through a contact surface between the second drive transmitter and the first drive transmitter (by static frictional force) around the fastening place where fastening force acts on. Therefore, the load torque is applied to the contact surface around the fastening place.

The fastening place can be set distant from the axial center and, as a result, a place where the first drive transmitter receives the load torque can be set distant from the axial center. Consequently, the load torque applied to the first drive transmitter can be more reduced than the load torque of the comparative drive transmission device, and the first drive transmitter is restrained from being distorted (twisted) in the rotation direction. Therefore, degradation in rotation accuracy can be more restrained than in the comparative drive transmission device.

Aspect 2.

In the aspect 1, a Young's modulus of the first drive transmitter such as the first gear 16 is smaller than a Young's modulus of the second drive transmitter 9.

With this characteristic, the Young's modulus of the first drive transmitter such as the first gear 16 is smaller than the Young's modulus of the second drive transmitter. Therefore, when load torque is applied to the first drive transmitter, the first drive transmitter is easily distorted (twisted). However, since the first drive transmitter is fastened to the second drive transmitter as described in the aspect 1, application of such large load torque to the first drive transmitter can be restrained. Consequently, the first drive transmitter is prevented from being distorted (twisted) even when the Young's modulus of the first drive transmitter is smaller than the Young's modulus of the second drive transmitter.

Aspect 3.

In the aspect 1 or 2, a thermal expansion coefficient of the first drive transmitter is higher (greater) than a thermal expansion coefficient of the second drive transmitter.

With this characteristic, as described in the embodiment, since the structure of the aspect 1 in which the first drive transmitter is fastened to the second drive transmitter is adopted in the structure in which the thermal expansion coefficient of the first drive transmitter is higher (greater) than the thermal expansion coefficient of the second drive transmitter, drive transmission can be performed excellently between the first drive transmitter and the second drive transmitter even at the time of temperature rise.

Aspect 4.

In any one of the aspects 1 to 3, hardness of the first drive transmitter such as the first gear 16 is made lower (smaller) than hardness of the second drive transmitter 9.

With this characteristic, occurrence of vibration and noise can be restrained as described in the embodiment.

Aspect 5.

In the aspects 1 to 4, the second drive transmitter 9 includes a shaft such as the metal shaft 9b, and at least one or more press-fit members to be press-fitted into the shaft, such as the second gear 9a and the fastening target member 9c.

With this characteristic, the shaft and the press-fit member can be integrally rotated as described in the embodiment. Additionally, with such press-fit into the shaft, centering can be performed with high accuracy with respect to the shaft and eccentricity of the press-fit member can be reduced. Furthermore, occurrence of distortion (twisting) can be reduced more than in a case where drive transmission is performed with the shaft by engagement of drive claws.

Aspect 6.

In any one of the aspects 1 to 4, the second drive transmitter 9 includes at least one or more press-fit members to be press-fitted into the bearing 96 supported at least to the fixed shaft 95.

With this characteristic, as illustrated in FIGS. 11A to 12B, the second drive transmitter 9 can be provided at the fixed shaft. Centering can be performed with high accuracy with respect to the shaft, and eccentricity of the press-fit member can be reduced Additionally, occurrence of distortion (twist) can be reduced.

Aspect 7.

In the aspect 5 or 6, the press-fit member is a gear, a pulley, or a joint.

With this characteristic, since twisting and eccentricity can be reduced, speed fluctuation can be restrained, and drive transmission can be performed with high accuracy.

Aspect 8.

In any one of the aspects 5 to 7, the second drive transmitter 9 includes two or more press-fit members, in which one of the press-fit members is a gear, a pulley, or a joint, and another one of the press-fit members is the fastening target member 9c to which the first drive transmitter such as the first gear 16 is fastened.

With this characteristic, fastening can be performed at a place more distant from the axial center than in a case where the first drive transmitter is fastened to the gear, pulley, or joint, and the load torque applied to the first drive transmitter can be reduced. Additionally, since the fastening target member is fixed to the shaft or the bearing by press-fitting, eccentricity of the fastening target member is restrained, and drive transmission is performed with high accuracy from the first drive transmitter to the gear, the pulley, or the joint via the fastening target member.

Aspect 9.

In any one of the aspects 5 to 7, provided is the fastening target member to be press-fitted into the press-fit member and to which the first drive transmitter is fastened.

With this characteristic, fastening can be performed at the place more distant from the axial center than in the case where the first drive transmitter is fastened to the gear, the pulley, or the joint, and the load torque applied to the first drive transmitter can be reduced. Additionally, since the fastening target member is fixed to the gear, the pulley, or the joint by press-fitting, eccentricity of the fastening target member can be restrained, and drive transmission can be performed from the first drive transmitter to the gear, the pulley, or the joint via the fastening target member with high accuracy.

Aspect 10.

In the aspect 7, the first drive transmitter such as the first gear 16 is fastened to the press-fit member.

With this characteristic, as described in Modified Examples 1 and 2, the number of parts can be more reduced and the cost of the device can be more cut down than in the case of providing the fastening target member.

Aspect 11.

In any one of the aspects 1 to 4, the second drive transmitter 9 include a transmitter forming member such as the metal member 92 including a shaft portion such as the shaft portion 92b and a drive transmission unit such as the second gear portion 92a.

With this characteristic, as described in Modified Examples 2 and 3, the number of parts can be more reduced and the cost of the device can be more cut down than in the case of including the metal shaft and the drive transmission unit respectively.

Aspect 12.

In the aspect 11, the first drive transmitter such as the first gear 16 is fastened to a transmitter forming member such as the metal member.

With this characteristic, the cost of the device can be cut down by reduction of the number of parts as described in Modified Example 2. Additionally, the press-fit member is eliminated and assembly can be more simplified.

Aspect 13.

In the aspect 11, the second drive transmitter 9 includes the fastening target member 9c to be press-fitted into a transmitter forming member such as the metal member 93, and to which the first drive transmitter such as the first gear 16 is fastened.

With this characteristic, a place to which the first gear 16 is fastened can be easily formed outside the drive transmission unit such as the second gear portion 93a as described in Modified Example 3

Aspect 14.

In any one of the aspects 11 to 13, the drive transmission unit is a gear, a pulley, or a joint.

Aspect 15.

In any one of the aspects 1 to 14, the first drive transmitter such as the first gear 16 includes a resin material.

With this characteristic, vibration and noise such as mesh vibration at the time of drive transmission can be excellently restrained as described in the embodiment.

Aspect 16.

In any one of the aspects 1 to 15, the second drive transmitter 9 includes metal.

With this characteristic, durability of the device can be improved as described in the embodiment. Additionally, rigidity of the device in the rotation direction can be enhanced, and therefore, speed fluctuation at the time of load fluctuation is restrained.

Aspect 17.

In any one of the aspects 1 to 16, the first drive transmitter is a gear, a pulley, or a joint.

Aspect 18.

In any one of the aspects 1 to 17, a drive transmission surface of the first drive transmitter such as the first gear 16 is located at a position more distant from the axial center than a drive transmission surface of the second drive transmitter 9, and the first drive transmitter is fastened to the second drive transmitter between the drive transmission surface of the second drive transmitter and the drive transmission surface of the first drive transmitter in a radial direction.

With this characteristic, as described in the embodiment, the load torque applied to the first drive transmitter can be more reduced and distortion (twisting) of the first drive transmitter can be more restrained than in the structure in which the first drive transmitter is fastened more on the axial center side than the drive transmission surface of the second drive transmitter. Therefore, degradation in rotation accuracy can be restrained.

Aspect 19.

In an image forming apparatus including a rotary body and a drive transmission device to transmit drive force of a drive source to the rotary body, the drive transmission device according to any of the aspects 1 to 18 is used as the drive transmission device.

With this characteristic, speed fluctuation of the rotary body can be restrained and an excellent image can be obtained as described in the embodiment.

Aspect 20.

In the aspect 19, the rotary body is an intermediate transfer body such as the intermediate transfer belt 61.

With this characteristic, speed fluctuation of the intermediate transfer body such as the intermediate transfer belt 61 is restrained when load torque is increased, for example, when a thick sheet enters the secondary transfer nip, and furthermore, generation of abnormal images such as banding can be restrained.

Numerous additional modifications and variations are possible in light of the above teachings. It is therefore to be understood that, within the scope of the above teachings, this disclosure may be practiced otherwise than as specifically described herein. With some embodiments having thus been described, it will be obvious that the same may be varied in many ways. Such variations are not to be regarded as a departure from the scope of this disclosure and appended claims, and all such modifications are intended to be included within the scope of this disclosure and appended claims.

What is claimed is:

1. An image forming apparatus comprising:
 a rotary body; and
 a drive transmission device, the drive transmission device comprising:
  a drive source to generate a drive force for transmission to the rotary body of the image forming apparatus;
  a first drive transmitter; and
  a second drive transmitter, coaxially arranged with being fastened to the first drive transmitter, including a material different from a material of the first drive transmitter and having a Young's modulus relatively larger than a Young's modulus of the first drive transmitter,
  the drive force of the drive source being transmitted between the first drive transmitter and the second drive transmitter,
  the first drive transmitter including a first gear and the second drive transmitter including a second gear, a diameter of the first gear being relatively greater than a diameter of the second gear, and
  the first drive transmitter and the second drive transmitter being fastened in a direction of the diameter of the first gear, at a position beyond the diameter of the second gear and within the diameter of the first gear.

2. The image forming apparatus of claim 1,
 wherein a thermal expansion coefficient of the first drive transmitter is relatively greater than a thermal expansion coefficient of the second drive transmitter.

3. The image forming apparatus of claim 1,
 wherein a hardness of the first drive transmitter is made relatively less than a hardness of the second drive transmitter.

4. The image forming apparatus of claim 1,
 wherein the second drive transmitter includes a shaft, and at least one press-fit member to be press-fitted into the shaft.

5. The image forming apparatus of claim 4,
 wherein the at least one press-fit member includes a gear.

6. The image forming apparatus of claim 5,
 wherein the second drive transmitter includes a fastening target member, to be press-fitted into the at least one press-fit member and to fasten the first drive transmitter.

7. The image forming apparatus of claim 5,
 wherein the first drive transmitter is fastened to the at least one press-fit member.

8. The image forming apparatus of claim 4,
wherein the at least one press-fit member of the second drive transmitter includes a plurality of press-fit members,
wherein one press-fit member of the plurality of press-fit members includes a gear, and
wherein another press-fit member of the plurality of press-fit members is a fastening target member to fasten the first drive transmitter.

9. The image forming apparatus of claim 1,
wherein the second drive transmitter includes at least one press-fit member to be press-fitted into a bearing supported to at least a fixed shaft.

10. The image forming apparatus of claim 1,
wherein the second drive transmitter includes a transmitter forming member including a shaft portion and a drive transmission unit.

11. The image forming apparatus of claim 10,
wherein the first drive transmitter is fastened to the transmitter forming member.

12. The image forming apparatus of claim 10,
wherein the second drive transmitter includes a fastening target member to be press-fitted into the transmitter forming member and to fasten the first drive transmitter.

13. The image forming apparatus of claim 10,
wherein the drive transmission unit includes a gear.

14. The image forming apparatus of claim 1,
wherein the first drive transmitter includes a resin material.

15. The image forming apparatus of claim 14,
wherein the second drive transmitter includes metal.

16. The image forming apparatus of claim 1,
wherein the second drive transmitter includes metal.

17. The image forming apparatus of claim 1,
wherein the first drive transmitter includes a gear.

18. The image forming apparatus of claim 1,
wherein the rotary body is an intermediate transfer body.

* * * * *